(12) United States Patent
Liu et al.

(10) Patent No.: US 8,575,414 B2
(45) Date of Patent: Nov. 5, 2013

(54) MEMBRANE SYSTEM FOR NATURAL GAS UPGRADING

(75) Inventors: Chunqing Liu, Schaumburg, IL (US); Syed A. Faheem, Huntley, IL (US); Raisa Minkov, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 89 days.

(21) Appl. No.: 13/287,582

(22) Filed: Nov. 2, 2011

(65) Prior Publication Data

US 2012/0157743 A1    Jun. 21, 2012

Related U.S. Application Data

(60) Provisional application No. 61/424,375, filed on Dec. 17, 2010.

(51) Int. Cl.
*C07C 7/144* (2006.01)

(52) U.S. Cl.
USPC .......................... 585/818; 210/649

(58) Field of Classification Search
None
See application file for complete search history.

(56) References Cited

U.S. PATENT DOCUMENTS

| | | | |
|---|---|---|---|
| 3,133,132 A | 5/1964 | Loeb et al. | |
| 4,230,463 A | 10/1980 | Henis et al. | |
| 4,855,048 A | 8/1989 | Tang et al. | |
| 4,877,528 A | 10/1989 | Friesen et al. | |
| 6,368,382 B1 | 4/2002 | Chiou | |
| 6,648,944 B1 * | 11/2003 | Baker et al. | 95/39 |
| 7,758,751 B1 | 7/2010 | Liu et al. | |
| 7,810,652 B2 | 10/2010 | Liu et al. | |
| 2009/0126567 A1 | 5/2009 | Liu et al. | |
| 2010/0133190 A1 | 6/2010 | Liu et al. | |
| 2012/0085238 A1* | 4/2012 | Zhou et al. | 96/9 |

FOREIGN PATENT DOCUMENTS

| | | |
|---|---|---|
| WO | 2005012397 A2 | 2/2005 |
| WO | 2005113121 A1 | 12/2005 |

OTHER PUBLICATIONS

Park, "Polymers with Cavities Tuned for Fast Selective Transport of Small Molecules and Ions", Science, vol. 318, Oct. 12, 2007, pp. 254-258.
Thomas, "Pure- and mixed-gas permeation properties of a microporous spirobisindane-based ladder polymer (PIM-1)", Journal of Membrane Science 333 (2009) 125-131.

* cited by examiner

*Primary Examiner* — Tam M Nguyen
(74) *Attorney, Agent, or Firm* — Mark Goldberg

(57) ABSTRACT

The present invention involves the use of a novel membrane system for natural gas upgrading. This membrane system includes a first-stage membrane such as a membrane prepared from the polymer of intrinsic microporosity (PIM) to selectively remove hydrocarbons from $C_3$ to $C_{35}$ to control the dew point of natural gas, and a second-stage membrane such as a polybenzoxazole (PBO) or crosslinked PBO membrane to selectively remove $CO_2$ from natural gas. The new membrane system described in the current invention eliminates the use of high cost and high footprint membrane pretreatment. Therefore, the membrane system can significantly reduce the footprint and cost for natural gas upgrading compared to the current commercially available membrane systems that include a non-membrane-related pretreatment system.

7 Claims, No Drawings

MEMBRANE SYSTEM FOR NATURAL GAS UPGRADING

CROSS-REFERENCE TO RELATED APPLICATION

This application claims priority from Provisional Application No. 61/424,375 filed Dec. 17, 2010, the contents of which are hereby incorporated by reference.

BACKGROUND OF THE INVENTION

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams.

However, it has been demonstrated in the early field practice that the membrane performance deteriorates very quickly with time if no pretreatment system was used. The major reason for the loss of membrane performance is heavy hydrocarbon liquid condensation on the membrane surface. Condensation can be prevented by providing a sufficient dew point margin for operation, based on the calculated dew point of the membrane product gas. UOP's MemGuard™ system, a pretreatment regenerable adsorbent system that uses molecular sieves, was 7 developed to remove water as well as heavy hydrocarbons ranging from $C_6$ to $C_{35}$ from the natural gas stream, hence, to lower the dew point of the stream. The selective removal of heavy hydrocarbons by a pretreatment system can significantly improve the performance of the membranes.

Although these pretreatment systems can effectively remove heavy hydrocarbons from natural gas streams to control the dew point of natural gas, the cost is very high. Some commercial membrane projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Therefore, the removal of the pretreatment system from the membrane system will remarkably reduce the cost of the membrane system especially for offshore natural gas applications.

The present invention describes the use of a novel membrane system without a high cost pretreatment unit for natural gas upgrading. Since, this new membrane system can be operated without a pretreatment system, it can significantly save costs and reduce the footprint.

DETAILED DESCRIPTION OF THE INVENTION

The present invention involves the use of a novel membrane system for natural gas upgrading. This membrane system includes a first-stage membrane to selectively remove hydrocarbons from $C_3$ to $C_{35}$ to control the dew point of natural gas, and a second-stage membrane to selectively remove $CO_2$ from natural gas. The new membrane system described in the current invention eliminates the use of high cost and high footprint membrane pretreatment systems. The membrane system described in the current invention does not require an inter-stage compressor. This is because the natural gas with controlled dew point comes out from the retentate side of the first membrane at high pressure and is directly introduced to the second membrane as a high pressure feed. Therefore, the membrane system significantly reduces the footprint and cost of the membrane system for natural gas upgrading compared to the current commercially available membrane systems that include a non-membrane-related pretreatment system. In addition, the membrane system significantly increases the purity and yield of the natural gas product due to the use of the second-stage membrane with much higher permeability and higher selectivity compared to the current commercial membrane systems for natural gas upgrading.

The membranes most commonly used for commercial natural gas upgrading applications such as cellulose acetate and polyimide are glassy polymers. These membranes, however, cannot be used to control the dew point of natural gas because they are more selectively permeable for $CH_4$ than for hydrocarbons from $C_3$ to $C_{35}$. Pretreatment system is necessary when using these commercial glassy polymer membranes for natural gas upgrading.

The membrane used as the first-stage membrane in the new membrane system described in the current invention is more selectively permeable for hydrocarbons from $C_3$ to $C_{35}$ than for $CH_4$. The first-stage membrane in the membrane system is prepared from a polymer of intrinsic microporosity (PIM). The structures of some representative PIMs that are used to make the first-stage membrane in the new membrane system described in the current invention and their preparation are indicated hereinafter.

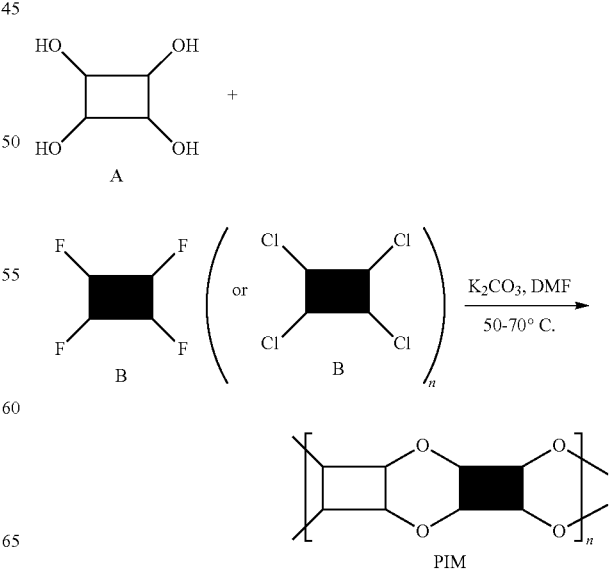

Structures and preparation PIMs

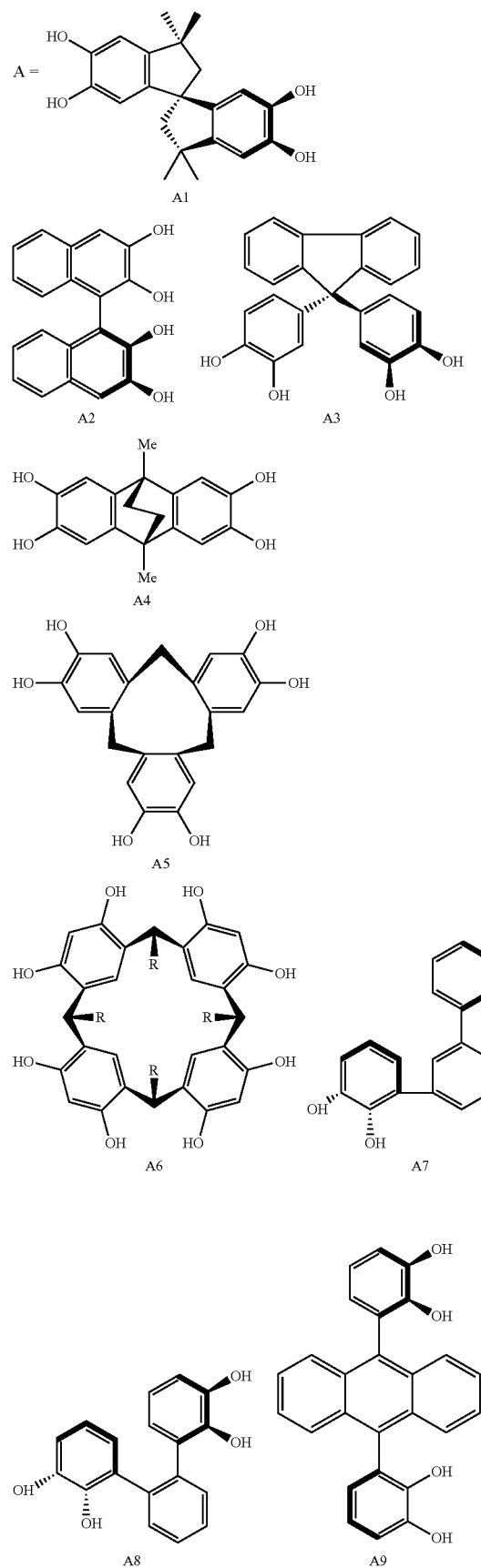
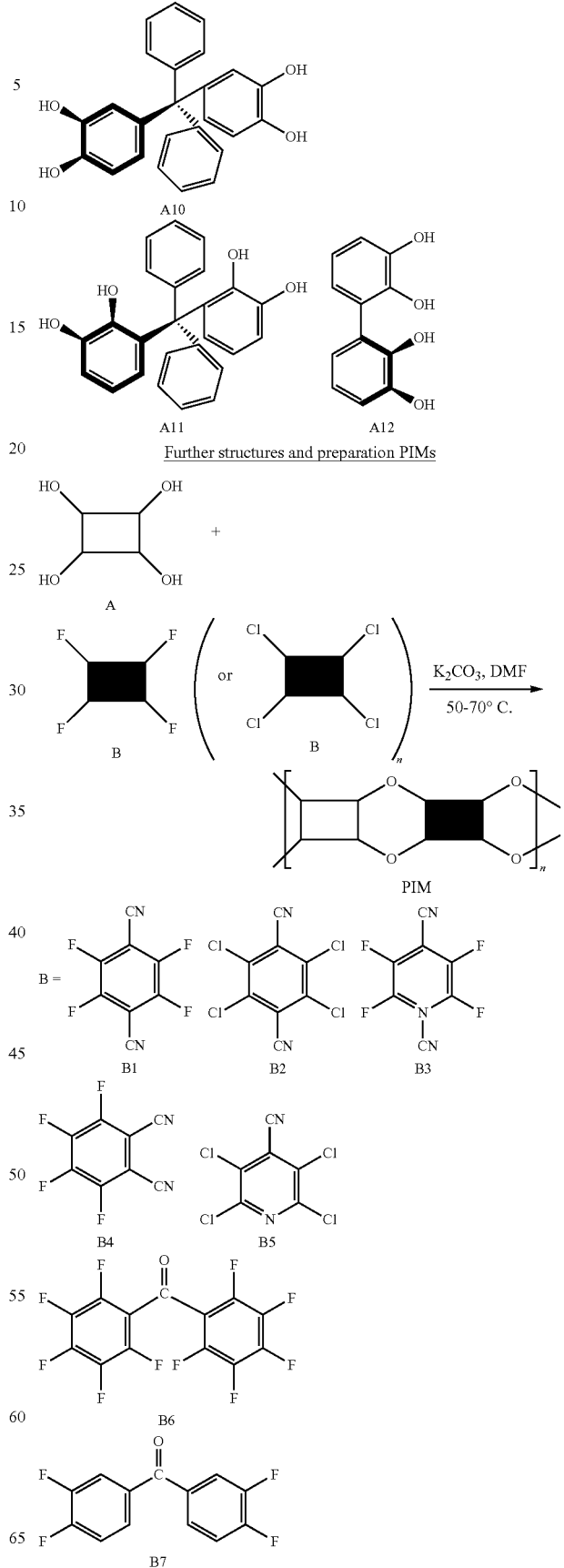
Further structures and preparation PIMs

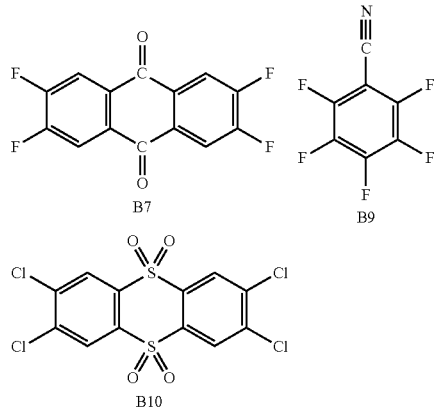

B7

B9

B10

The dioxane formation (i.e., a double aromatic nucleophilic substitution) offers a general reaction for the preparation of PIMs from appropriate hydroxylated aromatic monomers (e.g., A1-A12) and fluorinated (or chlorinated) aromatic monomers (e.g., B1-B10). These PIMs to be used as membrane materials for the preparation of the first-stage membranes in the membrane system in the present invention may be prepared according to the literature procedure. The synthesis of PIMs is well established in the literature. For example, for the synthesis of PIM-1 from monomers 3,3,3',3'-tetramethyl-1,1"-spirobisindane-5,5',6,6'-tetrol (A1) and 2,3,5,6-tetrafluoroterephthalonitrile (B1), an efficient dibenzodioxane-forming reaction (i.e. aromatic nucleophilic substitution) between the aromatic tetrol monomer A1 with the appropriate fluorine-containing compound B1 gave soluble PIM-1 with a high yield. PIM-1 is freely soluble in organic solvents such as methylene chloride, trichloromethane, THF, and DMAc. PIM-1 was purified by repeated precipitation from THF solution into methanol and when collected by filtration gave a fluorescent yellow free-flowing powder.

Synthesis of PIM-1

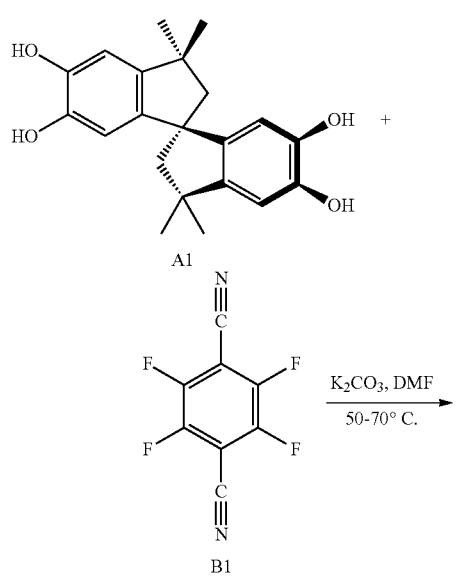

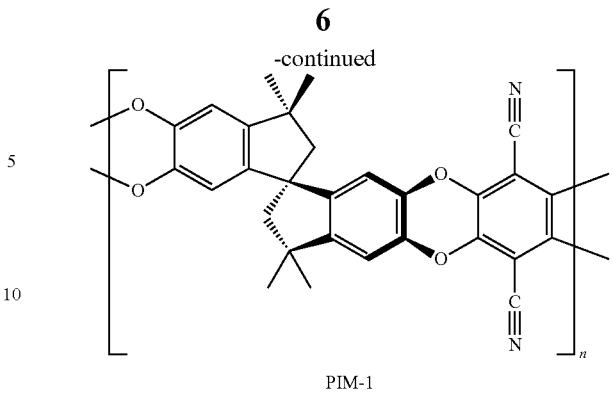

PIM-1

McKeown et al. reported the synthesis of a new type of polymer, termed polymers of intrinsic microporosity (PIMs), with a randomly contorted molecular structure, bridging the void between microporous and polymeric materials. The rotational freedom of these PIM materials has been removed from the polymer backbone. These polymers exhibit properties analogous to those of conventional microporous materials including large and accessible surface areas, interconnected micropores of less than 2 nm in size, as well as high chemical and thermal stability, but, in addition, possess some favorable properties of conventional polymers including good solubility and easy processability for the preparation of polymeric membranes. Polymeric membranes have been prepared directly from some of these PIMs and both the liquid and gas separation performances have been evaluated. Membranes from PIMs have shown exceptionally high gas permeability for separation of commercially important gas pairs, including $O_2/N_2$ and $CO_2/CH_4$. The exceptionally high permeability of gases arises from the rigid but contorted molecular structures of PIMs, frustrating packing and creating free volume, coupled with chemical functionality giving strong intermolecular interactions. Two published PCT patent applications provide further detail: WO 2005/012397 A2 and WO 2005/113121 A1, both applications incorporated by reference in their entireties. Membranes from PIMs, however, have much lower selectivities for commercially important gas pairs, such as $O_2/N_2$ and $CO_2/CH_4$, although their gas permeabilities are significantly higher than those of commercial polymeric membranes from glassy polymers such as CA, polyimides, and polyetherimides. Most recently, it has been reported in the literature that PIM-1 exhibited very good properties for the separation of n-butane/methane mixtures. See JOURNAL OF MEMBRANE SCIENCE, 2009, 333, 125. This work reported that PIM-1 membrane is more permeable to large, condensable organic vapors, such as n-butane, than to small, permanent gases, such as methane ($CH_4$).

In the current invention, the polymer membranes used as the first-stage membrane to control the dew point of natural gas were prepared from PIM polymers (e.g. PIM-1 membrane from PIM-1 polymer). The polymer membranes from PIMs were prepared by casting a homogeneous PIM solution (2-5 wt-%) into a glass ring on top of a clean glass plate and allowing the solvent to evaporate slowly inside a plastic cover for at least 12 hours at room temperature. The membranes were detached from the glass plate and dried at room temperature for 24 hours and then at 110° C. for at least 24 hours under vacuum. In some cases, the PIM membranes were immersed in methanol for 2 h at room temperature to reverse any prior membrane formation history after the membranes were dried at 110° C. under vacuum. After removal from methanol, the membranes were dried again at 70° C. under vacuum for at least 6 h. The membranes were transparent, around 20-100 μm thick. The solvents that can be used for dissolving PIMs include methylene chloride, trichloromethane, THF, acetone, DMF, NMP, DMSO, and others known to those skilled in the art.

The PIM polymer membranes can also be fabricated by a method comprising the steps of: dissolving the PIM polymer in a solvent to form a solution of the PIM material; contacting a porous membrane support (e.g., a support made from polyacrylonitrile with a $N_2$-permeance of $150\ m^3/m^2 \cdot h \cdot bar$, which should exceed the expected gas permeance of the selective PIM layer by at least 10 times) with said solution; and evaporating the solvent to provide a thin PIM selective layer on the supporting layer.

Tables 1 and 2 show the pure-gas permeabilities and selectivities of PIM-1 membrane. The permeabilities ($P_A$) and selectivities ($\alpha_{A/B}$) of the PIM-1 membrane for $CH_4$, $CO_2$, propylene ($C_3H_6$), propane ($C_3H_8$), and n-butane (n-$C_4H_{10}$) were measured by pure gas measurements at 25° C. It can be seen from Table 1 that PIM-1 membrane has over 50 times higher $CO_2$ permeability but lower $CO_2/CH_4$ selectivity than traditional polymer membranes such as CA, Matrimid polyimide, and Ultem polyetherimide membranes. However, different from these traditional polymer membranes which are more permeable to small gases, such as $CH_4$, than to large, condensable organic vapors, such as $C_3H_8$ and n-$C_4H_{10}$, the results in Table 2 have shown that PIM-1 membrane is much more permeable to large, condensable organic vapors, such as $C_3H_8$ and n-$C_4H_{10}$, than to small, permanent gases, such as $CH_4$. Therefore, PIM-1 is one of the preferred membranes as the first-stage membrane to selectively remove water and hydrocarbons from $C_3$ to $C_{35}$ to control the dew point of natural gas in the new membrane system described in the current invention. The high pressure retentate from the PIM-1 first-stage membrane mainly comprises $CH_4$, $CO_2$, and trace amount of ethane and propane, and some other components.

TABLE 1

Pure-Gas Permeation Test Results of Cellulose Acetate (CA), Matrimid, Ultem, and PIM-1 Membranes for $CO_2/CH_4$ Separation*

| Membrane | $P_{CO2}$ (Barrer) | $P_{CH4}$ (Barrer) | $\alpha_{CO2/CH4}$ |
|---|---|---|---|
| CA | 8.28 | 0.362 | 22.8 |
| Matrimid | 10.0 | 0.355 | 28.2 |
| Ultem | 1.95 | 0.0644 | 30.3 |
| PIM-1 | 6387.6 | 991.5 | 6.44 |

*$P_{CO2}$ and $P_{CH4}$ were tested at 50° C. and 791 kPa (100 psig);
1 Barrer = $10^{-10}\ cm^3(STP) \cdot cm/cm^2 \cdot sec \cdot cmHg$.

TABLE 2

Pure-Gas Permeation Test Results of PIM-1 Membrane

| Gas | Permeability (Barrer) | Selectivity (gas/$CH_4$) |
|---|---|---|
| $CH_4$ [a] | 690.3 | — |
| $H_2$ [a] | 3050.3 | 4.42 |
| $CO_2$ [a] | 6622.5 | 9/59 |
| Propane ($C_3H_8$) [a] | 3327.2 | 4.82 |
| n-butane (n-$C_4H_{10}$) [b] | 29494.7 | 42.7 |

[a] Tested at 30° C. and 446 kPa (50 psig);
[b] Tested at 30° C. and 205 kPa (15 psig);
1 Barrer = $10^{-10}\ cm^3(STP) \cdot cm/cm^2 \cdot sec \cdot cmHg$.

The membrane used as the second-stage membrane in the new membrane system described in the current invention has much higher $CO_2/CH_4$ selectivity than the first-stage membrane and also has much higher $CO_2$ permeability or both higher $CO_2$ permeability and higher $CO_2/CH_4$ selectivity than the commercial polymer membranes for natural gas upgrading. Therefore, the new membrane system significantly increases the purity and yield of the natural gas product with the use of the second-stage membrane for natural gas upgrading.

Preferably the membrane materials for the second-stage membrane in the new membrane system described in the current invention are selected from polybenzoxazole (PBO) polymers and crosslinked PBO polymers that have high permeability and/or high selectivity.

A recent publication in the journal SCIENCE reported on a new type of high permeability polybenzoxazole polymer membrane for gas separations (Ho Burn Park et al, SCIENCE 318, 254 (2007)). These polybenzoxazole membranes are prepared from high temperature thermal rearrangement of polyimide polymer membranes containing pendent hydroxyl groups ortho to the heterocyclic imide nitrogen. These polybenzoxazole polymer membranes exhibited extremely high $CO_2$ permeability (>1000 Barrer) for $CO_2/CH_4$ separation.

The PBO membranes as reported in the literature (see Ho Burn Park et al, SCIENCE, 318, 254 (2007)) are selected as one of the preferred second-stage membrane in the new membrane system described in the current invention. The PBO membrane can be prepared from PBO polymer by thermal conversion of any hydroxy-containing polyimides with pendent hydroxyl groups ortho to the heterocyclic imide nitrogen upon heating between 250° C. and 600° C. under inert atmosphere such as nitrogen or vacuum. The thermal conversion is accompanied by loss of carbon dioxide and no other volatile byproducts are generated. These hydroxy-containing polyimide polymers comprise a plurality of first repeating units of a formula (I), wherein said formula (I) is:

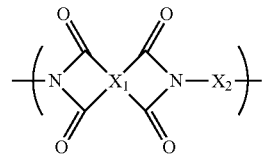

where $X_1$ of formula (I) is selected from the group consisting of

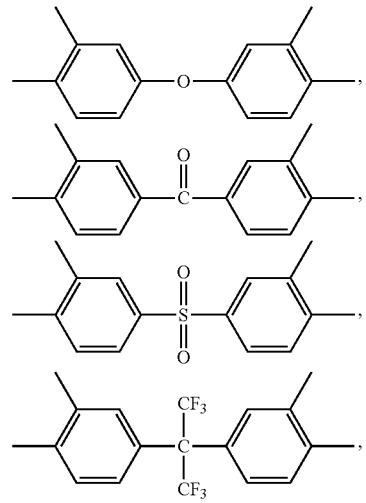

-continued

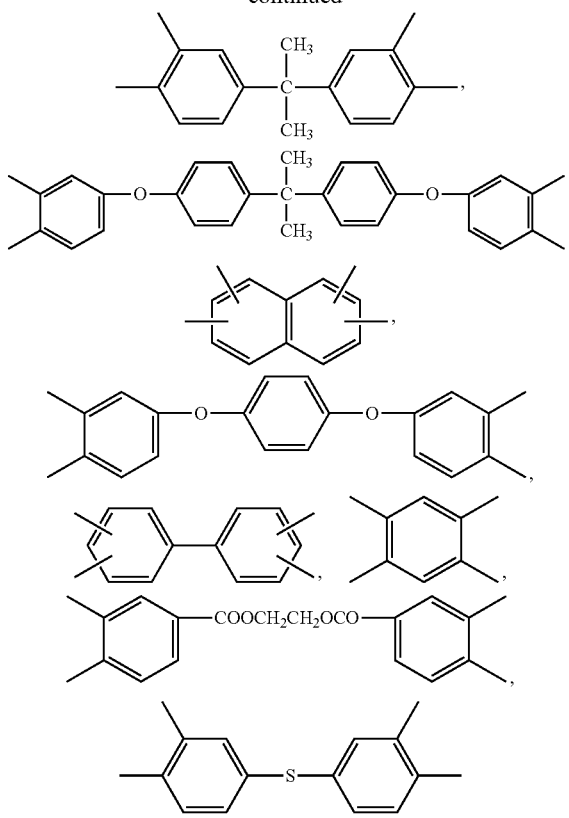

and mixtures thereof, —X$_2$— of formula (I) is selected from the group consisting of

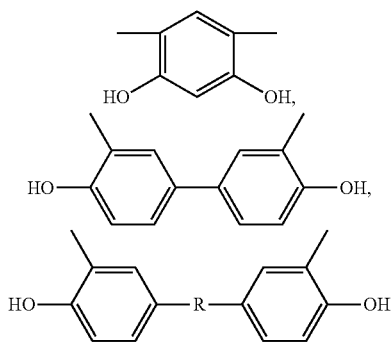

and mixtures thereof, and —R— is selected from the group consisting of

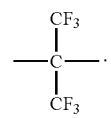

and mixtures thereof.

It is preferred that X$_1$ group of formula (I) is selected from the group consisting of

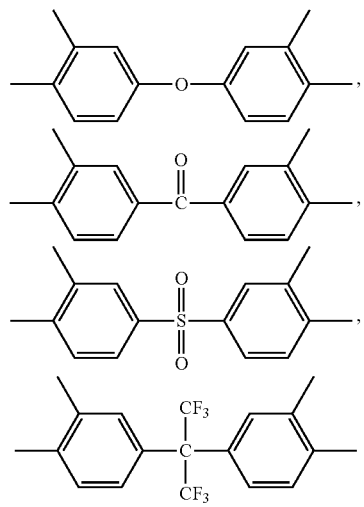

and mixtures thereof.

It is preferred that —X$_2$— group of formula (I) is selected from the group consisting of

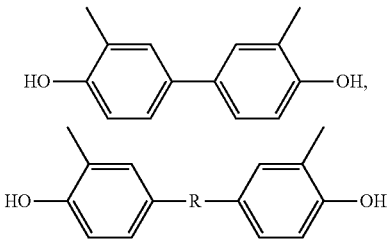

and mixtures thereof, and it is preferred that —R— group is represented by the formula:

$$-\underset{\underset{CF_3}{|}}{\overset{\overset{CF_3}{|}}{C}}-.$$

Some preferred hydroxy-containing polyimide polymers that are used in the present invention include, but are not limited to, poly[2,2'-bis-(3,4-dicarboxyphenyl) hexafluoropropane dianhydride-2,2-bis(3-amino-4-hydroxyphenyl)-hexafluoropropane] (poly(6FDA-APAF)), poly[3,3',4,4'-benzophenonetetracarboxylic dianhydride-2,2-bis(3-amino-4-hydroxyphenyl)-hexafluoropropane] (poly(BTDA-APAF)), poly(3,3',4,4'-benzophenonetetracarboxylic dianhydride-3,3'-dihydroxy-4,4'-diamino-biphenyl) (poly(BTDA-HAB)), poly[4,4'-oxydiphthalic anhydride-2,2-bis(3-amino-4-hydroxyphenyl)-hexafluoropropane] (poly(ODPA-APAF)), poly[3,3',4,4'-diphenylsulfone tetracarboxylic dianhydride-2,2-bis(3-amino-4-hydroxyphenyl)-hexafluoropropane] (poly(DSDA-APAF)), poly(3,3',4,4'-diphenylsulfone tetracarboxylic dianhydride-2,2-bis(3-amino-4-hydroxyphenyl)-hexafluoropropane-3,3'-dihydroxy-4,4'-diamino-biphenyl) (poly(DSDA-APAF-HAB)), poly[2,2'-bis-(3,4-dicarboxyphenyl) hexafluoropropane dianhydride-3,3',4,4'-benzophenonetetracarboxylic dianhydride-2,2-bis(3-amino-4-hydroxyphenyl)-hexafluoropropane] (poly(6FDA-BTDA-APAF)), poly [4,4'-oxydiphthalic anhydride-2,2-bis(3-amino-4-hydroxyphenyl)-hexafluoropropane-3,3'-dihydroxy-4,4'-diamino-biphenyl] (poly(ODPA-APAF-HAB)), poly[3,3',4,4'-benzophenonetetracarboxylic dianhydride-2,2-bis(3-amino-4-hydroxyphenyl)-hexafluoropropane-3,3'-dihydroxy-4,4'-diamino-biphenyl] (poly(BTDA-APAF-HAB)), poly[2,2'-bis-(3,4-dicarboxyphenyl) hexafluoropropane dianhydride-3,3'-dihydroxy-4,4'-diamino-biphenyl] (poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane] (poly(BPADA-BTDA-APAF)).

The hydroxy-containing polyimide polymers with pendent hydroxyl groups ortho to the heterocyclic imide nitrogen that are used for the preparation of the PBO membrane as the second-stage membrane in the present invention are synthesized from diamines and dianhydrides in polar solvents such as 1-methyl-2-pyrrolidione (NMP) or N,N-dimethylacetamide (DMAc) by a two-step process involving the formation of the poly(amic acid)s followed by a solution imidization or a thermal imidization. Acetic anhydride is a preferred dehydrating agent and pyridine (or triethylamine) is a preferred imidization catalyst for the solution imidization reaction as described in the examples herein. Then, a polyimide membrane is prepared from the hydroxy-containing polyimide polymer in any convenient form such as sheet, disk, thin film composite, tube, or hollow fiber. The PBO membrane as the second-stage membrane in the present invention is prepared from thermal conversion of the hydroxy-containing polyimide membrane upon heating between 250° and 600° C. under inert atmosphere such as nitrogen or vacuum. For example, PBO membranes can be prepared from a hydroxyl-containing polyimide (poly[2,2'-bis-(3,4-dicarboxyphenyl) hexafluoropropane dianhydride-2,2-bis(3-amino-4-hydroxyphenyl)-hexafluoropropane], poly(6FDA-APAF)) membrane via a high temperature heat treatment at 400° C. and 450° C., respectively. The poly(6FDA-APAF) polyimide polymer was synthesized from solution condensation of 2,2-bis(3-amino-4-hydroxyphenyl)-hexafluoropropane diamine monomer (Bis-APAF) and 2,2'-bis-(3,4-dicarboxyphenyl) hexafluoropropane dianhydride monomer (6FDA).

The PBO membranes used as the second-stage membrane in the present invention can be fabricated into any convenient form such as sheet, disk, tube, or hollow fiber. These membranes can also be fabricated into thin film composite membranes incorporating a selective thin PBO layer and a porous supporting layer comprising a different polymer material or an inorganic material.

Another type of membrane used as the second-stage membrane in the present invention is a new type of crosslinked polybenzoxazole (PBO) polymer membrane. The crosslinked PBO polymer membrane is prepared from crosslinkable polyimide polymers comprising both UV crosslinkable functional groups in the polymer backbone and pendent hydroxyl groups ortho to the heterocyclic imide nitrogen via thermal conversion followed by UV radiation. The crosslinked PBO polymer membranes described in the current invention comprise PBO polymer chain segments wherein at least a part of these polymer chain segments are crosslinked to each other through possible direct covalent bonds by exposure to UV radiation or other crosslinking process. The crosslinking of the PBO membranes provides the membranes with significantly improved membrane selectivity and chemical and thermal stabilities.

The crosslinked PBO membrane as the second-stage membrane in the present invention is prepared by: 1) fabricating a polyimide membrane from the hydroxy- and UV crosslinkable functional group-containing polyimide polymer; 2) converting the polyimide membrane to PBO membrane by heating between 250° and 600° C. under inert atmosphere such as nitrogen or vacuum; and 3) finally converting the PBO membrane to new crosslinked PBO membrane by UV radiation. In some cases a membrane post-treatment step can be added after step 3) by coating the top surface of the crosslinked PBO membrane with a thin layer of high permeability material such as a polysiloxane, a fluoro-polymer, a thermally curable silicone rubber, or a UV radiation curable epoxy silicone.

The both hydroxy- and UV crosslinkable functional group-containing polyimide polymers that are used for the preparation of the crosslinked PBO membrane as the second-stage membrane in the present invention comprises a plurality of first repeating units of a formula (II), wherein said formula (II) is:

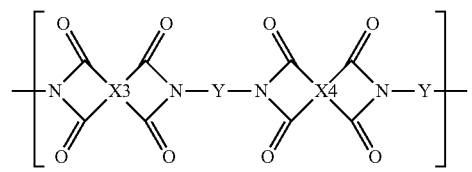

where X3 of formula (II) is

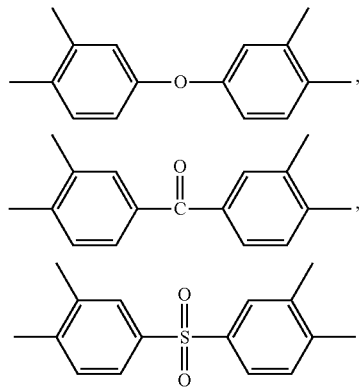

or mixtures thereof, X4 of formula (II) is either the same as X3 or is selected from

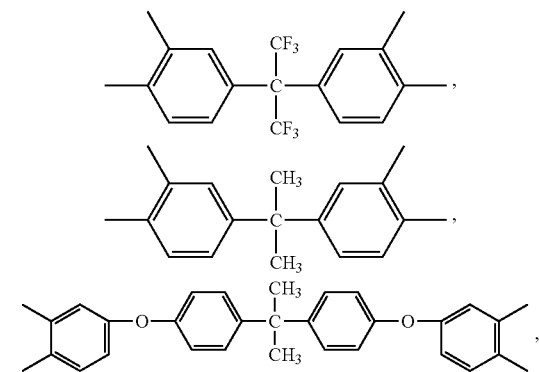

-continued

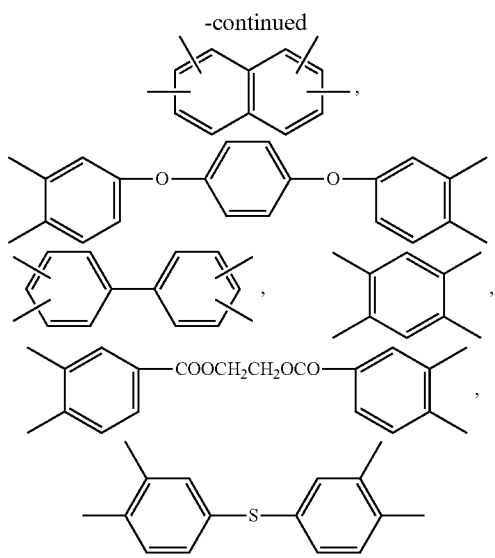

or mixtures thereof, —Y— of formula (II) is

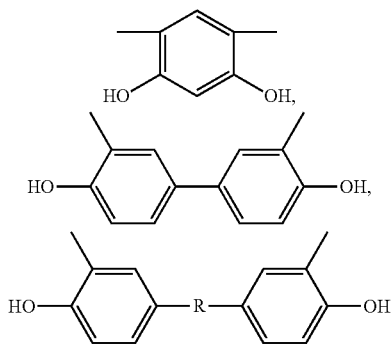

or mixtures thereof, —R— is

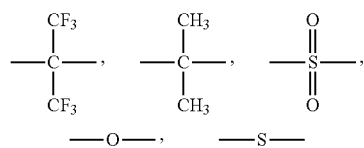

or mixtures thereof.

In one embodiment of the invention, when the preferred X3 and X4 of formula (II) are the same, they are selected from the group of:

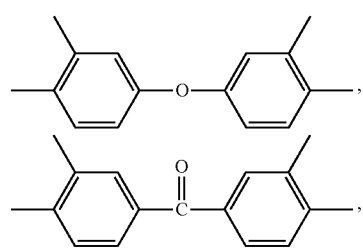

-continued

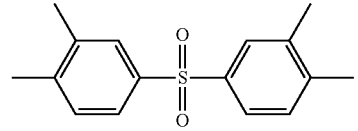

or mixtures thereof.

In another embodiment of the invention, X3 of formula (II) is selected from the group of:

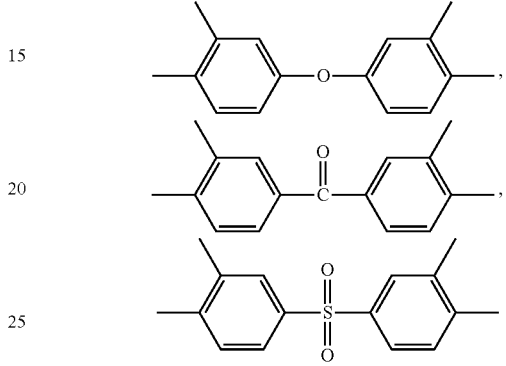

or mixtures thereof, X4 of said formula (II) is selected from the group of:

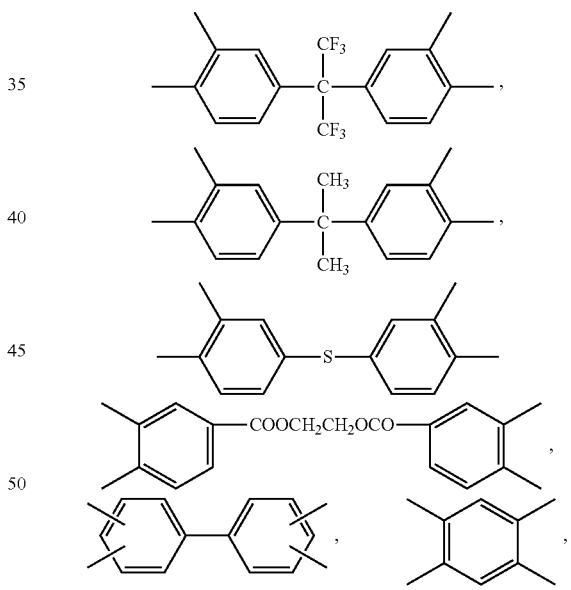

or mixtures thereof.

The polyimide membrane that is used for the preparation of the crosslinked PBO membrane in the present invention can be fabricated by a method comprising the steps of dissolving the polyimide polymer in a solvent to form a solution of the polyimide material, contacting a porous membrane support (e.g., a support made from inorganic ceramic material) with this solution and evaporating the solvent to provide a thin selective layer comprising the polyimide polymer material on the supporting layer.

The polyimide membrane that is used for the preparation of the crosslinked PBO membrane in the present invention can also be fabricated as an asymmetric membrane with flat sheet or hollow fiber geometry by phase inversion followed by direct air drying through the use of at least one drying agent which is a hydrophobic organic compound such as a hydrocarbon or an ether (see U.S. Pat. No. 4,855,048). The polyimide membrane can also be fabricated as an asymmetric membrane with flat sheet or hollow fiber geometry by phase inversion followed by solvent exchange methods (see U.S. Pat. No. 3,133,132).

The both hydroxy- and UV crosslinkable functional group-containing polyimide membrane is converted to PBO membrane by heating between 250° and 600° C. under inert atmosphere such as nitrogen or vacuum. The crosslinked PBO membrane is then formed by UV-crosslinking the PBO membrane using a UV lamp from a distance and for a period of time selected based upon the separation properties sought. For example, the crosslinked PBO membrane can be prepared from PBO membrane by exposure to UV radiation using 254 nm wavelength UV light generated from a UV lamp with 1.9 cm (0.75 inch) distance from the membrane surface to the UV lamp and a radiation time of 30 min at less than 50° C. The UV lamp described here is a low pressure, mercury arc immersion UV quartz 12 watt lamp with 12 watt power supply from Ace Glass Incorporated. Optimization of the cross-linking degree in the crosslinked PBO membrane should promote the tailoring of the properties of the crosslinked PBO membranes. The crosslinking degree of the crosslinked PBO membrane can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 0.5 min to 1 hour. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 0.5 to 40 minutes.

In some cases a membrane post-treatment step can be added after the formation of the crosslinked PBO membrane with a thin layer of high permeability material such as a polysiloxane, a fluoro-polymer, a thermally curable silicone rubber, or a UV radiation curable epoxy silicone deposited on the membrane surface. The coating fills the surface pores and other imperfections comprising voids (see U.S. Pat. No. 4,230,463; U.S. Pat. No. 4,877,528; U.S. Pat. No. 6,368,382).

The new crosslinked PBO membranes as the second-stage membrane in the present invention can have either a nonporous symmetric structure or an asymmetric structure with a thin nonporous dense selective layer supported on top of a porous support layer. The porous support can be made from the same crosslinked PBO material or a different type of material with high thermal stability. The new crosslinked PBO membranes used as the second-stage membrane in the present invention can be fabricated into any convenient geometry such as flat sheet (or spiral wound), tube, disk, hollow fiber, or thin film composite.

The new type of crosslinked PBO membrane used as the second-stage membrane in the present invention has the advantages of ease of processability, both high selectivity and high permeation rate or flux, high thermal stability, and stable flux and sustained selectivity over time by resistance to solvent swelling, plasticization and hydrocarbon contaminants.

Table 3 shows the pure-gas permeabilities and selectivities of cellulose acetate polymer membrane, PBO(BTDA-APAF-450C) membrane, and UV crosslinked PBO(BTDA-APAF-450C) membrane. The cellulose acetate membrane is one of the commercial polymer membranes for natural gas upgrading. The PBO(BTDA-APAF-450C) membrane was prepared from a hydroxy-containing polyimide (poly[3,3',4,4'-benzophenonetetracarboxylic dianhydride-2,2-bis(3-amino-4-hydroxyphenyl)-hexafluoropropane] (poly(BTDA-APAF)) membrane via high temperature heat treatment at 450° C. for 1 hour in $N_2$. The poly(BTDA-APAF) polyimide polymer was synthesized from solution condensation of 2,2-bis(3-amino-4-hydroxyphenyl)-hexafluoropropane diamine monomer (APAF) and 3,3',4,4'-benzophenonetetracarboxylic dianhydride monomer (BTDA). The crosslinked PBO(BTDA-APAF-450C) polymer membrane was prepared by further UV crosslinking the PBO(BTDA-APAF-450C) polymer membrane by exposure to UV radiation using 254 nm wavelength UV light generated from a UV lamp with 1.9 cm (0.75 inch) distance from the membrane surface to the UV lamp and a radiation time of 20 min at 50° C. The UV lamp described here is a low pressure, mercury arc immersion UV quartz 12 watt lamp with 12 watt power supply from Ace Glass Incorporated.

It can be seen from Table 3 that the PBO(BTDA-APAF-450C) polymer membrane showed significantly higher $CO_2$ permeability ($P_{CO2}$=535.9 Barrer at 50° C. testing temperature) and slightly higher $CO_2/CH_4$ selectivity (26.0 at 50° C. testing temperature) than the cellulose acetate membrane. After crosslinking, the crosslinked PBO(BTDA-APAF-450C) polymer membrane showed significantly increased $CO_2/CH_4$ selectivity (48.4 at 50° C. testing temperature) compared to the PBO(BTDA-APAF-450C) membrane at 50° C. testing temperature. These results show that PBO membrane or crosslinked PBO membrane is a good candidate as the second-stage membrane in the new membrane system disclosed in the present invention.

TABLE 3

Pure Gas Permeation Test Results of PBO(BTDA-APAF-450C) and the Cross-linked PBO(BTDA-APAF-450C) Polymer Membranes for $CO_2/CH_4$ Separation *

| Membrane | $P_{CO2}$ (Barrer) | $\alpha_{CO2/CH4}$ |
|---|---|---|
| Cellulose acetate | 8.28 | 22.8 |
| PBO(BTDA-APAF-450C) | 535.9 | 26.0 |
| cross-linked PBO(BTDA-APAF-450C) | 219.5 | 48.4 |

* $P_{CO2}$ and $P_{CH4}$ were tested at 50° C. and 791 kPa (100 psig);
1 Barrer = $10^{-10}$ cm$^3$(STP) · cm/cm$^2$ · sec · cmHg.

The invention claimed is:

1. A two stage membrane separation process for treating a natural gas stream comprising sending said natural gas stream to a first-stage membrane to selectively remove hydrocarbons from $C_3$ to $C_{35}$ to control the dew point of natural gas, and a second-stage membrane to selectively remove CO2 from said natural gas, wherein said first-stage membrane comprises a polymer of intrinsic microporosity, wherein the said second-stage membrane comprises a cross-linked polybenzoxazole membrane prepared by fabricating a polyimide membrane from the hydroxyl- and UV crosslinkable functional group-containing polyimide polymer; converting the polyimide membrane to polybenzoxazole membrane by heating between 250° and 600° C. under inert atmosphere; and then converting the polybenzoxazole membrane to said crosslinked polybenzoxazole membrane by UV radiation.

2. The process of claim 1 wherein said polymer of intrinsic microporosity comprises a reaction product of 3,3',3'-tetramethyl-1,1''-spirobisindane-5,5',6,6'-tetrol and 2,3,5,6-tetrafluoroterephthalonitrile.

3. The process of claim 1 wherein said first-stage membrane has a porous membrane support.

4. The process of claim 1 wherein said process operates without a pretreatment unit.

5. The process of claim 1 wherein said first-stage or said second-stage membrane is coated on a top surface with a layer of a high permeability material selected from the group consisting of a polysiloxane, a fluoro-polymer, a thermally curable silicone rubber, and a UV radiation curable epoxy silicone.

6. The process of claim 1 wherein said first-stage and said second-stage membranes are an asymmetric membrane with flat sheet or hollow fiber geometry.

7. The process of claim 1 wherein said cross-linked polybenzoxazole membrane comprises a nonporous symmetric structure or an asymmetric structure with a thin nonporous dense selective layer supported on top of a porous support layer.

\* \* \* \* \*